L. MALONE.
ADJUSTABLE AUTOMOBILE SEAT.
APPLICATION FILED MAR. 13, 1916.
1,219,654.
Patented Mar. 20, 1917.
2 SHEETS—SHEET 1.
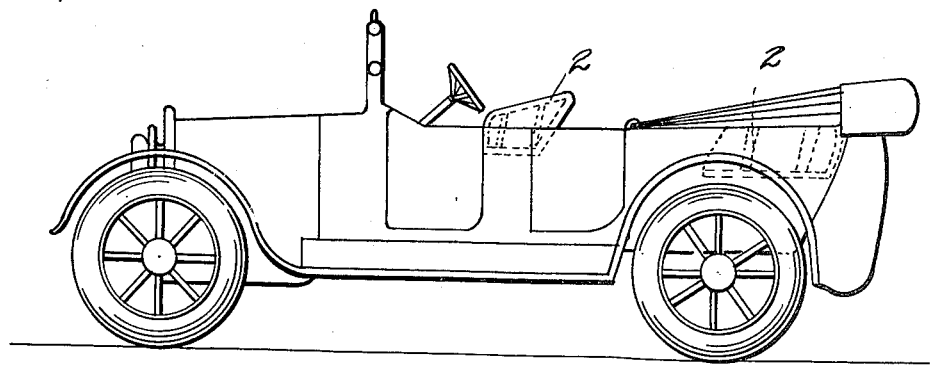
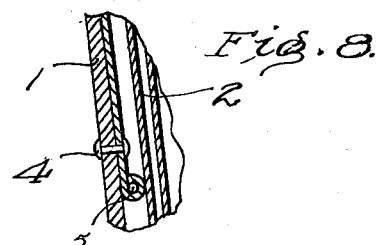
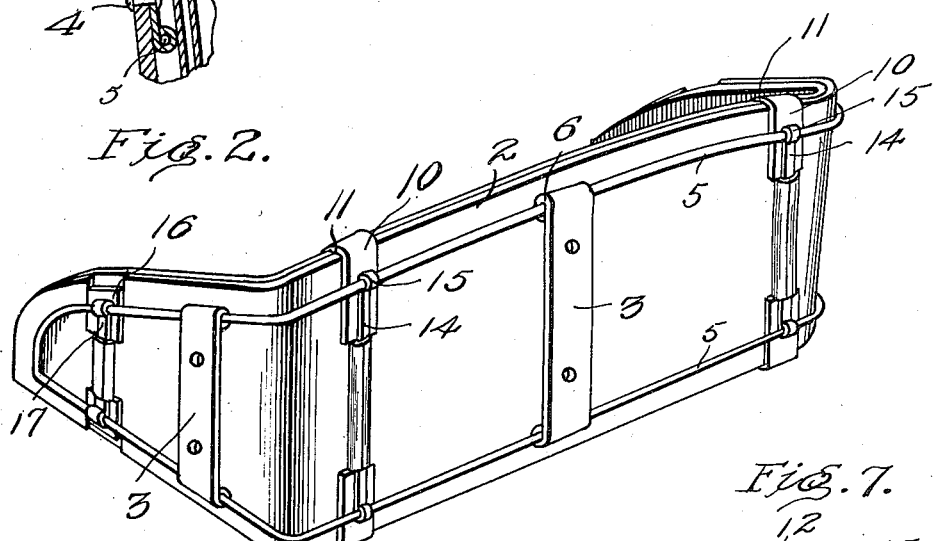
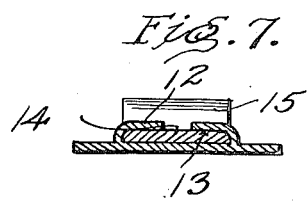
Witnesses
M. Z. Shea.
Chas. E. Smith.
Inventor
L. Malone
By E. E. Grooman & Co.,
his Attorneys L. MALONE.
ADJUSTABLE AUTOMOBILE SEAT.
APPLICATION FILED MAR. 13, 1916.
1,219,654.
Patented Mar. 20, 1917.
2 SHEETS—SHEET 2.
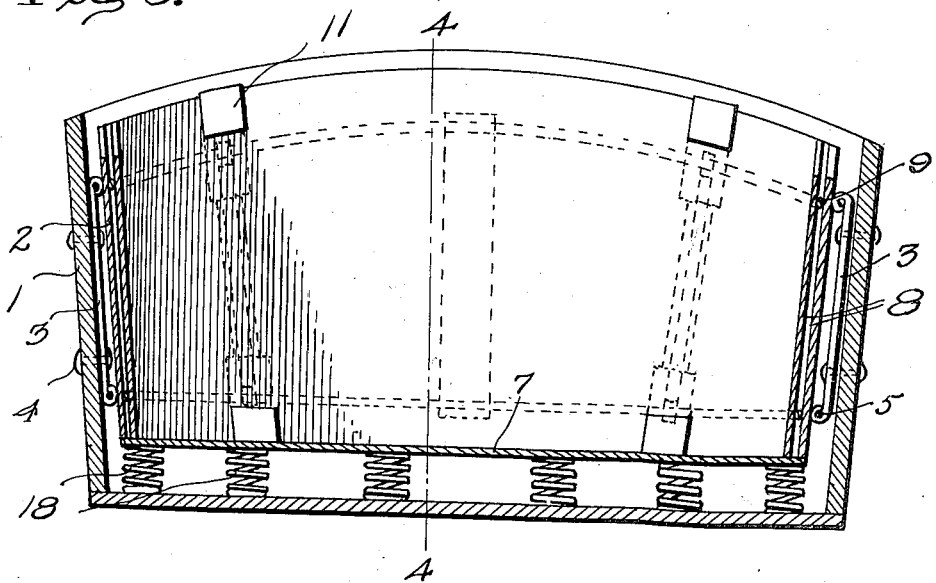
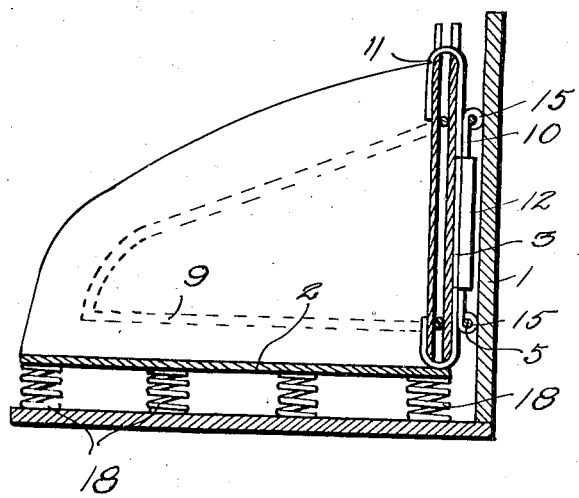
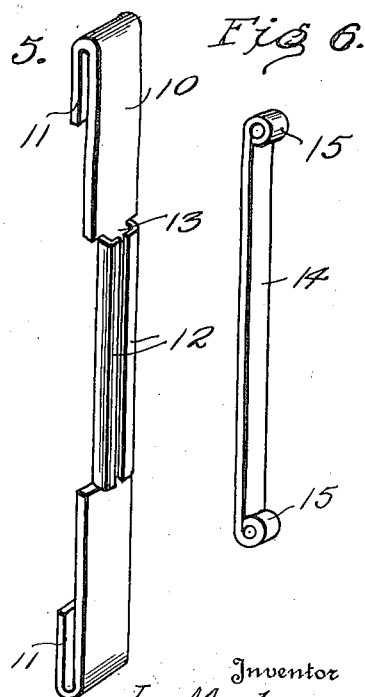
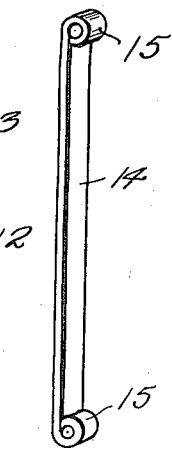
Witnesses
M. J. Shea
Chas. E. Smith
Inventor
L. Malone
By E. E. Trooman & Co.
his Attorneys

UNITED STATES PATENT OFFICE.

LEO MALONE, OF OCONOMOWOC, WISCONSIN.

ADJUSTABLE AUTOMOBILE-SEAT.

1,219,654.

Specification of Letters Patent.

Patented Mar. 20, 1917.

Application filed March 13, 1916. Serial No. 83,889.

*To all whom it may concern:*

Be it known that I, LEO MALONE, a citizen of the United States of America, residing at Oconomowoc, in the county of Waukesha and State of Wisconsin, have invented certain new and useful Improvements in Adjustable Automobile-Seats, of which the following is a specification, reference being had therein to the accompanying drawing.

This invention relates to an automobile seat and has for its object the production of a simple and efficient seat which will be yieldably supported and will automatically give for absorbing the shocks caused by the unevenness of the road over which the automobile may travel.

Another object of this invention is the production of a simple and efficient seat known as the "lazy-back" for causing the seat to be yieldably supported and moved up and down with the body of the person who is occupying the seat.

Other objects and advantages of this invention will appear throughout the following specification and claims.

In the accompanying drawings:—

Figure 1 is a side elevation of an automobile, showing the seat applied thereto.

Fig. 2 is a perspective view of the frame of the seat.

Fig. 3 is a central longitudinal section of the frame.

Fig. 4 is a section taken on line 4—4 of Fig. 3.

Fig. 5 is a detailed perspective of one of the track bars carried by the seat.

Fig. 6 is a detailed perspective of one of the connecting links for the frame of the seat.

Fig. 7 is a transverse sectional view through one of the track bars and links, showing the manner in which the links are mounted therein.

Fig. 8 is a vertical section through a portion of the supporting frame for the seat, showing the manner in which the seat frame is secured to the supporting frame thereof.

Referring to the accompanying drawings by numerals it will be seen that 1 designates the supporting frame within which the main portion of the seat 2 is placed. A plurality of strap portions 3 are secured to the inner face of the frame 1 by means of rivets 4. These strap portions 3 are secured to the bands 5 forming the outer frame work of the seat frame 2 by having the rolled portions 6 thereof wound over the bands 5. These bands 5 are formed to fit snugly around the back and sides of the seat frame as clearly illustrated in detail in Fig. 2 of the drawings.

The seat frame 2 comprises a bottom portion 7 and the sides and back comprise a pair of spaced plates 8, between which plates 8 pass the reinforcing bands 9 of similar construction to the bands 5 above described.

A plurality of track plates 10 are secured to the back of the seat 2 by having their ends 11 overhang the back of the seat 2 as illustrated clearly in Fig. 2 of the drawings.

These track plates 10 are provided with centrally located rolled flanges 12 which constitute a channel 13 in which the links 14 are adapted to travel. These links 14 are provided with eyes 15 fitting over the bands 5 and constituting a means for holding the seat 2 in engagement with the bands 5.

A track plate 16 is secured to each end of the seat frame 2 as illustrated in Fig. 2 of the drawings and each of these track plates 16 carries a link 17 which is also secured to the band 5, as illustrated in Fig. 2.

A plurality of coiled springs 18 are carried by the main frame 1 and support the seat frame 2 as illustrated in Figs. 3 and 4 of the drawings.

From the foregoing description it will be seen that when the automobile travels over a rough road the shock will cause the seat frame 2 to move upwardly and downwardly in view of the fact that the seat frame 2 is yieldably supported upon the springs 18. This reciprocating movement is made possible due to the fact that the members 3 are secured to the frame 1 and the seat 2 is only secured to the links 14, which links 14 are in turn connected to the band 5 carried by the links or members 3. The links 14 are anchored and thereby will allow the track members 10 to move upwardly and downwardly by permitting the channel 13 to reciprocate upon the links 14, thereby causing the seat to have the same movement as the body of the person occupying the same.

From the foregoing description it will be seen that a very simple and efficient automobile seat has been produced which will allow the body of the seat to have a free movement and at the same time will be so supported within the automobile as to prevent the same from being displaced.

What I claim is:—

1. A device of the class described comprising a main supporting frame, a seat frame, bands passing around the rear of said seat frame, means for anchoring said bands to said main supporting frame, and means slidably connecting said seat frame to said bands and permitting the free upward and downward movement of said seat frame with respect to said bands and supporting frame.

2. In a device of the class described the combination with a main supporting frame, of a seat frame, bands passing around said seat frame, means for anchoring said bands to said main supporting frame, track plates secured to said seat frame, links connected to said bands and working upon said track plates for permitting the free upward and downward movement of said seat frame with respect to said bands, and means for yieldably supporting said seat frame upon said main supporting frame.

3. In a device of the class described the combination with a main supporting frame, of a seat frame, said seat frame comprising a bottom and also comprising a back and side portions, said back and side portions comprising a pair of spaced plates, reinforcing bands interposed between said plates, an outer band secured to said seat frame, means for anchoring said outer band in engagement with said main supporting frame, means for yieldably supporting said seat frame, and means connecting said seat frame to said outer band and permitting a free upward and downward movement of said seat frame with respect thereto.

4. In a device of the class described the combination with a main supporting frame, of a seat frame, an outer band, plates for anchoring said outer band to said main supporting frame, track plates secured to said seat frame, said track plates provided with centrally located outwardly rolled portions for constituting a track channel, links secured to said band and working in said channel for connecting said seat frame to said band and at the same time permitting the free upward and downward movement of said seat frame, and means for yieldably supporting said seat frame.

In testimony whereof I hereunto affix my signature.

LEO MALONE.